United States Patent [19]

Layer

[11] 3,862,133
[45] Jan. 21, 1975

[54] GAMMA-LACTONES OF O-HYDROXYPHENYLACETIC ACIDS

[75] Inventor: Robert W. Layer, Cuyohoga Falls, Ohio

[73] Assignee: The B. F. Goodrich Company, New York, N.Y.

[22] Filed: Apr. 30, 1973

[21] Appl. No.: 355,508

[52] U.S. Cl. .............................. 260/343.3, 252/404
[51] Int. Cl. ............................................. C07d 5/34
[58] Field of Search ................................. 260/343.3

[56] References Cited
UNITED STATES PATENTS
3,676,463  7/1972  Kadin ............................. 260/343.3

Primary Examiner—Donald G. Daus
Assistant Examiner—Anne Marie T. Tighe
Attorney, Agent, or Firm—J. Hughes Powell, Jr.

[57] ABSTRACT

γ-lactones of o-hydroxyphenylacetic acids are readily prepared by reacting a hydroxybenzene compound and glyoxal using an acidic catalyst. The γ-lactones may be used to prepare new rubbers and plastics by ring opening polymerization techniques. 4,7-di-t-butyl-5-hydroxy benzofuran-2(3H)-one has antioxidant activity and acts as a stabilizer.

1 Claim, No Drawings

GAMMA-LACTONES OF O-HYDROXYPHENYLACETIC ACIDS

BACKGROUND OF THE INVENTION

The prior art teaches several methods for the preparation of γ-lactones of hydroxyarylacetic acids. One method involves nitration, reduction and hydrolysis of benzofuran. Another method involves the addition of hydrogen cyanide to salicylaldehyde, followed by reduction with hydrogen iodide. The reaction of phenols and mandelic acid produces 3-phenyl benzofuran-2(3H)-ones. Certain quinones react with sodio malonate, followed by cyclization to give benzofuranones. Several methods are described in R. H. Rodd, Chemistry of Carbon Compounds, Volume IV-A, pp. 174, 180–181. These methods are often tedious, give poor yields, are hazardous and expensive, or are too specific to be of general utility.

The prior art teaches also the reaction of a hydroxyaromatic compound and glyoxal to produce an ether structure, an inner acetal structure, and certain other structures rather than the lactone structure. Such art includes Rosenthal, et al, Can. J. Chem., Vol. 38 (1960), p. 2277; Thyagarajan, et al, Can. J. Chem., Vol. 44 (1966), p. 633; Coxsworth, Can. J. Chem., Vol. 45 (1967), p. 1777; Dischendorfer, Monatsh., Vol. 73 (1940), p. 45; Chwala, et al, Monatsh., Vol. 82 (1951), p. 652; and U.S. Pats. Nos. 2,515,909 and 2,564,192. An improved method of preparing γ-lactones of o-hydroxyphenylacetic acids is desired.

SUMMARY OF THE INVENTION

It has been found that reaction between a hydroxybenzene compound and glyoxal using an acidic catalyst provides a way to produce directly and readily γ-lactones of o-hydroxyphenylacetic acids selected from the group consisting of 4,7-di-t-butyl-5-hydroxybenzofuran-2(3H)-one, 5-chloro-4-methylbenzofuran-2(3H)-one, and 5-alkyl-7-alkylbenzofuran-2-(3H)-one wherein one alkyl group contains 1 to 8 carbon atoms and the other alkyl group contains 4 to 8 carbon atoms.

DETAILED DESCRIPTION

Reaction of hydroxybenzene compounds with glyoxal using an acidic catalyst is used to prepare γ-lactones of o-hydroxyphenylacetic acids. The hydroxybenzene compounds have the formula

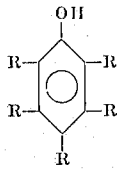

and the γ-lactones of o-hydroxyphenylacetic acids have the formula

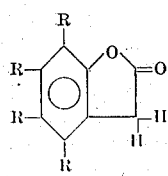

wherein R is hydrogen or an electron releasing substituent on the benzene nucleus and is selected from the group consisting of hydroxy, alkyl, aryl, alkaryl, aralkyl, alkoxy, aryloxy, amino, aralkylamino, alkarylamino, N-alkyl-N-arylamino, dialkylamino, diarylamino, acylimino, acyloxy, thioalkyl, thioaryl, bromo, chloro and iodo. The aryl, alkaryl, aralkyl or thioaryl group(s) attached to the aromatic nucleus may also have said R groups as substituents.

More preferably, R is selected from the group consisting of hydrogen or hydroxy, dialkylamino, acylimino or acyloxy having 2 to 12 carbon atoms, aryl, thioaryl or aryloxy having 6 to 12 carbon atoms, alkyl, alkoxy or thioalkyl having 1 to 12 carbon atoms, alkaryl, aralkyl, alkarylamino, aralkylamino or N-alkyl-N-arylamino having 7 to 14 carbon atoms, amino, diarylamino having 10 to 20 carbon atoms, and bromo, chloro or iodo.

Even more preferably, R is selected from the group consisting of hydrogen, hydroxy, bromo, chloro, iodo and at least one alkyl group having 1 to 12 carbon atoms.

Most preferred are γ-lactones of o-hydroxyphenylacetic acids selected from the group consisting of 4,7-di-t-butyl-5-hydroxybenzofuran-2(3H)-one, 5-chloro-4-methylbenzofuran-2-(3H)-one, and 5-alkyl-7-alkylbenzofuran-2(3H)-one wherein one alkyl group contains 1 to 8 carbon atoms and the other alkyl group contains 4 to 8 carbon atoms.

Hydroxybenzene compounds used in the process of this invention preferably have one unsubstituted position ortho to a hydroxyl group, but certain groups, such as t-butyl and the like may occupy an ortho position and are displaced during γ-lactone formation. Side reactions tend to occur as the number of unsubstituted positions normally subject to electrophilic attack is increased, and the yield of the desired lactone is reduced greatly. The hydroxybenzene compound may also contain electron-withdrawing groups such as cyano, nitro, sulfo, acyl, carboxy, carbamyl, carbalkoxy, carbaryloxy and the like; however, these groups typically decrease alkylation reaction rates, as is known to those skilled in the art. Thus, the nature, position and number of substituent groups determine the reaction rate and, in fact, whether the reaction will proceed at all. For example, phenol provides less benzofuran-2(3H)-one, because it has three reactive positions (2,4 and 6), than 2,4-dimethylphenol which gives a good yield of 5,7-dimethylbenzofuran-2(3H)-one.

Suitable hydroxybenzene compounds include phenol and phenols substituted with groups of the type described heretofore, such as catechol, resorcinol, hydroquinone, 2,5-di-t-butyl hydroquinone, o-cresol, m-cresol, p-cresol, 2-t-butyl-p-cresol, 2,4-di-t-pentylphenol, 2,6-di-t-butyl-4-methyl phenol, 2,2'-dihydroxybiphenyl, 4,4'-dihydroxybiphenyl, 4,4'-methylenediphenol, 2-methoxyphenol, 3-methoxyphenol, 4-methoxyphenol, 2-dimethylaminophenol, 2-bromophenol, 2-chlorophenol, 4-chloro-3-methylphenol, 4-acetoxyphenol, 4-methylmercaptophenol, 2,2'-di-t-butyl-4,4'-isopropylidenediphenol, 4,4'-thiobis-(2-t-butyl-6-methylphenol), and the like. Excellent results were obtained with 2,5-di-t-butylhydroquinone, 2-t-butyl-p-cresol, 2,4-di-t-pentylphenol, 4-chloro-3-methylphenol, and 2,6-di-t-butyl-4-methyl phenol.

The glyoxal may be used in the anhydrous form but the commercial aqueous solutions of glyoxal are more preferably used. Derivatives of glyoxal which can generate glyoxal in situ may also be used, such as glyoxal·NaHSO$_4$. The glyoxal may be used in a molar ratio to the hydroxybenzene compound of from about one-tenth to about 10/1. More preferably, the ratio is about 1/1.

Acids which may be used to catalyze the reaction of hydroxybenzene compounds with glyoxal include organic acids having 1 to 12 carbon atoms such as acetic acid, propionic acid, benzoic acid, monoesters and diesters of orthophosphoric acid, alkaryl sulfonic acids such as p-toluenesulfonic acid and the like; inorganic acids capable of releasing protons such as boric acid, hydrochloric acid, phosphoric acid, sulfuric acid and the like; acid activated clays capable of releasing protons such as Retrol (produced by Filtrol Corp.), bentonite and the like; acidic resins capable of relasing protons such as Dowex 50-X10 (a cationic exchange resin which is a sulfonated copolymer of styrene and divinylbenzene produced by Dow Chemical Company) and the like; and Lewis acids capable of accepting electrons such as aluminum chloride, zinc chloride, boron trifluoride and the like. The amount of acid catalyst used may be as little as about 0.01% based on total reactant weight, or the catalyst may be used as the solvent in which the reaction is run. Mixtures of acids may also be used.

Acetic acid is a useful solvent for these reactions because of its availability, boiling point, water miscibility, ability to dissolve a wide variety of hydroxybenzene compounds, and catalytic effect on the reaction. The reaction may also be run in inert solvents which include carboxylic acids such as o-toluic acid, esters such as n-butyl acetate, ethers such as bis[2-(2-methoxyethoxy)ethyl]ether, alcohols such as 1-pentanol, ketones such as benzophenone, and the like. The reaction mady also be run in a two-phase system where one reactant is soluble in one phase and the other reactant is soluble in a second phase, such as a hydrocarbon and water system. An emulsifying agent may be used to facilitate the reaction in the two-phase system.

since the hydroxybenzene compounds differ greatly in their reactivity toward glyoxal as described heretofore, the reaction times, temperatures and catalyst amounts may vary significantly also. Temperatures above 25°C. are generally used, and temperatures above 100°C. are more preferred.

The process of this invention may be used to prepare readily and directly a variety of benzofuran-2-(3H)-one substituted with R groups described heretofore. The products of the present invention have many uses. For example, they may be used to prepare new rubbers and plastics by ring opening polymerization techniques known to those skilled in the art. 4,7-di-t-butyl-5-hydroxybenzofuran-2(3H)-one has antioxidant activity and acts as a stabilizer.

The following examples are intended to illustrate the present invention more fully.

EXAMPLE 1

44.4 grams (0.2 mole) of 2,5-d-t-butylhydroquinone and 30 grams (0.2 mole) of 40% aqueous glyoxal were dissolved in 250 milliliters of glacial acetic acid, and 2 milliliters of concentrated hydrochloric acid was added. The reaction mixture was stirred and refluxed for 4 hours, 200 milliliters of water was added, and a solid collected by filtration in 94% yield was determined to be 85% pure. The product was recyrstallized from ethanol-water and then benzene to give a white solid with melting point of 209°–211°C. Infrared analysis gave a characteristic lactone band at 1800 $cm^{-1}$. The NMR spectrum was consistent with the structural assignment of 4,7-di-tertiary-butyl-5-hydroxybenzofuran-2(3H)-one.

Calculated: C, 75.63; H, 9.97. Found: C, 73.15; H, 8.43.

EXAMPLE 2

33 grams (0.2 mole) of 2-t-butyl-paracresol and 30 grams (0.2 mole) of 40% aqueous glyoxal were dissolved in 250 milliliters of glacial acetic acid, and 100 milliliters of concentrated hydrochloric acid was added. The reaction mixture was heated at 56°C. for 17 hours, 200 milliliters of water was added, and a solid collected by filtration in 95% yield was determined to be 85% pure. The product was recrystallized from glacial actic acid to give a solid with a melting point of 179°–180°C. Infrared analysis gave a characteristic 1,800 $cm^{-1}$ lactone band. The NMR spectrum was consistent with the structural assignment of 5-methyl-7-t-butylbenzofuran-2(3)-one.

Calculated: C, 76.44; H, 7.90. Found C, 77.09; H, 7.94.

EXAMPLE 3

33 grams (0.2 mole) of 2-t-butyl-paracresol and 15 grams (0.1 mole) of 40% aqueous glyoxal were dissolved in 250 milliliters of glacial acetic acid, and 5 milliliters of concentrated hydrochloric acid was added. The reaction mixture was stirred and refluxed at 106°C. for 16 hours, 200 milliliters of water was added, and a solid collected by filtration in 100% yield was determined to be 92% pure by vapor phase chromatographic analysis. Chromatographic retention time established the product as identical to that in Example 2.

EXAMPLE 4

47.2 grams (0.2 mole) of 2,4-di-t-pentyl phenol and 30 grams (0.2 mole) of 40% aqueous glyoxal were dissolved in 200 milliliters of glacial acetic acid, and 2 milliliters of concentrated hydrochloric acid was added. The reaction mixture was stirred and refluxed at 105°–110°C. for 2 hours, cooled and poured into 1 liter of water. An organic oil was separated, extracted with benzene, and distilled to give an oil (98% yield) which was determined by gas chromatography to be 95% pure. The product solidified on standing and was recrystallized from hexane to give white crystals with a melting point of 57°–58°C. Infrared analysis gave a characteristic 1,800 $cm^{-1}$ lactone band. The NMR spectrum was consistent with the structural assignment of 5,7-ditertiary-pentylbenzofuran-2-(3H)-one.

Calculated: C, 78.22:H, 9.48. Found: C, 79.36; H, 9.55.

EXAMPLE 5

44 grams (0.2 mole) of 2,6-di-t-butyl-4-methyl phenol and 30 grams (0.2 mole) and 40% aqueous glyoxal were dissolved in 200 milliliters of glacial acetic acid, and 2 milliliters of concentrated hydrochloric acid was added. The reaction mixture was stirred and refluxed at 106°C. for 10 hours. Crystallization occurred upon cooling, and a solid was filtered from the reaction mixture in 86% yield and found to be 50% pure. The solid was recrystallized from ethanol to give white needles with a melting point of 179°–180°C. Infrared analysis showed a characteristic 1800 $cm^{-1}$ lactone band. The NMR spectrum was consistent with the structural assignment of 5-methyl-7-t-butylbenzofuran-2(3H)-one.

Calculated: C, 76.44; H, 7.90. Found: C, 77.09; H, 7.94.

EXAMPLE 6

28 grams (0.2 mole) of 4-chloro-3-methylphenol and 30 grams (0.2 mole) of 40% aqueous glyoxal were dissolved in 150 milliliters of glacial acetic acid, and 4 milliliters of concentrated hydrochloric acid was added. The reaction mixture was stirred and refluxed for 4 hours, and 500 milliliters of water was added. An organic oil was separated (77% yield), extracted with ether, and distilled to give an oil which was 30% pure. The oil crystallized on standing and was recrystallized from benzene and ethanol and found to have a melting point of 131.5°–133°C. Infrared analysis gave a characteristic 1,800 cm$^{-1}$ lactone band. The NMR spectrum was consistent with the structural assignment of 5-chloro-4-methylbenzofuran-2(3H)-one.

Calculated: C, 59.19; H, 3.86. Found: C, 61.11; H, 4.15.

EXAMPLE 7

4,7-di-t-butyl-5-hydroxybenzofuran-2(3H)-one was shown by the following procedure to have antioxidant activity and act as a stabilizer for SBR-1502. SBR-1502 is the International Institute of Synthetic Rubber Producers, Inc. designation for the nonstaining styrene-butadiene dry copolymer made by the cold process using a fatty acid-rosin acid mixed emulsifier, coagulated using salt acid, and having about 23.5% bound styrene and a nonimal Mooney viscosity (ML 1+4 at 212°F.) of about 52. An SBR-1502 sample was dissolved in benzene, precipitated in methanol to remove any original antioxidant, vacuum-dried to remove methanol and weighed. The SBR-1502 was redissolved in benzene, one part of antioxidant to be evaluated was mixed into the solution per hundred parts of SBR-1502, and a thin SBR-1502 film was cast onto a KBr crystal and dried at room temperature. The film was oven-aged at 85°C. and examined daily using infrared spectroscopy for carbonyl band formation at 1730 cm$^{-1}$. Effectiveness of 4,7-di-t-butyl-5-hydroxybenzofuran-2(3H)-one as an antioxidant is shown by means of the above procedure. Carbonyl band formation was found to occur in an SBR-1502 control after 2 days, and in SBR-1502 stabilized by 4,7-di-t-butyl-5-hydroxybenzofuran-2(3H)-one after 11 days.

I claim:

1. A composition of matter, 4,7-di-t-butyl-5-hydroxybenzofuran-2(3H)-one.

* * * * *